United States Patent
Wurms et al.

(10) Patent No.: US 12,359,761 B2
(45) Date of Patent: Jul. 15, 2025

(54) NON-METALLIC CONDUIT HUBS

(71) Applicant: Hubbell Incorporated, Shelton, CT (US)

(72) Inventors: Scott B. Wurms, Shelton, CT (US); Joseph Cretella, Ansonia, CT (US)

( * ) Notice: Subject to any disclaimer, the term of this patent is extended or adjusted under 35 U.S.C. 154(b) by 189 days.

(21) Appl. No.: 17/953,902

(22) Filed: Sep. 27, 2022

(65) Prior Publication Data

US 2023/0096708 A1    Mar. 30, 2023

Related U.S. Application Data

(60) Provisional application No. 63/261,714, filed on Sep. 27, 2021.

(51) Int. Cl.
| | |
|---|---|
| *F16L 47/14* | (2006.01) |
| *F16L 47/28* | (2006.01) |
| *H02G 3/08* | (2006.01) |

(52) U.S. Cl.
CPC .............. *F16L 47/14* (2013.01); *F16L 47/28* (2013.01); *H02G 3/085* (2013.01); *F16L 2201/10* (2013.01)

(58) Field of Classification Search
CPC .......... H02G 3/085; F16L 47/14; F16L 47/28; F16L 2201/10
See application file for complete search history.

(56) References Cited

U.S. PATENT DOCUMENTS

| | | | | | |
|---|---|---|---|---|---|
| 3,129,463 | A | * | 4/1964 | Gill, Jr. ..................... | H01J 5/42 100/231 |
| 5,200,575 | A | * | 4/1993 | Sheehan .............. | H02G 3/0675 174/541 |
| 9,667,053 | B2 | * | 5/2017 | Wurms .................. | H02G 3/081 |
| 10,230,229 | B2 | | 3/2019 | Wurms | |
| 2016/0294170 | A1 | * | 10/2016 | Thomas ................... | H02G 3/08 |
| 2018/0199452 | A1 | * | 7/2018 | Dumani ................... | H02G 3/10 |
| 2020/0191309 | A1 | * | 6/2020 | McMillan ............... | F16L 25/01 |
| 2021/0203141 | A1 | * | 7/2021 | Hagen .................. | H01R 33/965 |

OTHER PUBLICATIONS

International Search Report and Written Opinion issued in corresponding International Application No. PCT/US22/44874, mailed Feb. 8, 2023, 9 pages.

* cited by examiner

*Primary Examiner* — Timothy J Thompson
*Assistant Examiner* — Rhadames Alonzo Miller
(74) *Attorney, Agent, or Firm* — Verrill Dana, LLP; Robert L. Hover

(57) ABSTRACT

Non-metallic conduit hubs are provided herein, having a flange configured for attachment to an electrical box, a receiving member extending from a first side of the flange and defining a bore sized for receiving a conduit, an indexing indicator extending radially outward from the receiving member for providing a tactile indication of an orientation of the conduit hub, and an alignment member extending from a second side of the flange and having an outer diameter sized for insertion into an ingress/egress port of the electrical box, wherein the bore extends through the receiving member, the flange, and the alignment member to facilitate routing of wires from the conduit into the electrical box.

20 Claims, 10 Drawing Sheets

NON-METALLIC CONDUIT HUBS

CROSS-REFERENCE TO RELATED APPLICATION

This application claims the benefit of priority to U.S. Provisional Application No. 63/261,714, filed Sep. 27, 2021, which is incorporated herein by reference.

FIELD OF THE INVENTION

This invention relates to conduit hubs and more particularly to non-metallic conduit hubs.

BACKGROUND OF THE INVENTION

Power and data cables are conventionally routed to electrical boxes such as electrical floor boxes and fire-rated poke-throughs via conduits. Electrical floor boxes, for example, can be installed within various flooring mediums (e.g., poured concrete, wood flooring, or raised access flooring), whether at or above grade (at ground level, also referred to as "slab on grade", or higher, such as the second story floor and up). In general, such electrical boxes provide power, data, and audio-visual (AV) connections at the walking plane of the floor.

There are generally three types of conduit: rigid metallic conduit, electrical metallic tubing (EMT), and non-metal conduit, which is typically constructed of a plastic such as polyvinyl chloride (PVC). Depending on the location of the floor box (at or above grade) and the flooring medium, various building codes limit or dictate the size and type of conduit to be used for routing the electrical wiring necessary to provide the connections that a particular floor box configuration requires. For example, metallic, particularly EMT conduit, may not be recommended for use in slab on grade applications because of, for example, the potential for corrosion of the conduit by exposure to fluid containing acidic concrete component chemicals.

In general, rigid conduit can be threaded at each end for connection to electrical boxes or other terminals via threaded connectors. EMT and non-metal conduit cannot be threaded due to a lack of thickness and/or mechanical strength but are more flexible. Instead, EMT conduit is generally connected using set-screw or compression connectors and couplings for installation. On the other hand, non-metal conduit is generally connected using a solvent adhesive/cement connection to non-metal connectors.

For many applications (e.g., slab on grade) it can be desirable to use metal floor boxes with non-metallic conduit. However, the solvent adhesives used to connect non-metallic conduit, in some cases, are not usable for connecting non-metallic conduit to metal floor boxes. Such incompatibility may stem from chemical incompatibility with the metal of the floor box and/or simply from the box itself being too thin to provide proper adhesion.

Conventionally, such incompatibility creates significant excess labor costs. Referring now to FIGS. 1A-1B, conventionally, in order to provide a connection between non-metal conduit and a metal floor box, a corresponding non-metallic terminal adapter 100 ("adapter") and lock nut 125 or bushing 150 must be used. Referring also to FIGS. 2A-2C, installation (not shown) of the adapter 100 first requires disassembling the floor box 200 by removing a non-metallic concrete pour cap 201, a metallic pour cap 203, a top mounting plate 205, and a knockout plate 207 from a box 209 of the floor box 200. As shown in FIG. 2C, in some cases the floor box is pre-assembled with the desired outlet terminals 211, in which case those too will need to be disassembled. A threaded end 101 of the adapter 100 is then inserted through a hole located where the knockout plate 207 was removed and the lock nut 125 or bushing 150 can be threaded onto the threaded end 101 of the adapter 100 within the floor box 200 to secure the adapter 100 to the floor box 200. The floor box 200 must then be reassembled before finally connecting a corresponding conduit to a non-threaded end 103 of the adapter 100, typically by a solvent adhesive.

The process of disassembly and reassembly described above is usually repeated for each of a plurality of floor boxes distributed throughout a footprint of the building being constructed, adding significant time and labor cost to the project. Therefore, there is a continuing need to provide a means for quickly connecting non-metallic conduit to a floor box without disassembling the floor box.

SUMMARY OF INVENTION

Provided herein are non-metallic conduit hubs for connecting power and data conduits to electrical boxes such as floor boxes and fire-rated poke-throughs.

In one aspect, a non-metallic conduit hub is provided. The non-metallic conduit hub includes a flange configured for attachment to an electrical box. The non-metallic conduit hub also includes a receiving member extending from a first side of the flange and defining a bore sized for receiving a conduit. The non-metallic conduit hub also includes an indexing indicator extending radially outward from the receiving member for providing a tactile indication of an orientation of the conduit hub. The non-metallic conduit hub also includes an alignment member extending from a second side of the flange and having an outer diameter sized for insertion into an ingress/egress port of the electrical box, wherein the bore extends through the receiving member, the flange, and the alignment member to facilitate routing of wires from the conduit into the electrical box.

In some embodiments, the flange further comprises a plurality of flange bolt holes patterned for alignment with a corresponding plurality of electrical box bolt holes of the electrical box for bolting of the non-metallic conduit hub to the electrical box. In some embodiments, the flange is sized to slide into tracks of a slot formed on the electrical box. In some embodiments, the non-metallic conduit hub also includes an adhesive for adhering the flange to the electrical box. In some embodiments, the non-metallic conduit hub also includes a keying feature defined in the indexing indicator of the receiving member for receiving a key of a keyed adapter. In some embodiments, the keyed adapter also includes an adapted bore defined therein, the adapted bore having a smaller diameter than a diameter of the bore of the receiving member. In some embodiments, the keying feature is a slot. In some embodiments, the non-metallic conduit hub is constructed of at least one of PVC, fiberglass reinforced epoxy, reinforced thermosetting resin, or combinations thereof. In some embodiments, the electrical box is constructed of at least one of metal or metal having a corrosion resistant coating. In some embodiments, the electrical box is a non-metallic electrical box, the non-metallic electrical box being constructed of at least one of PVC, fiberglass reinforced epoxy, reinforced thermosetting resin, or combinations thereof.

In another aspect, an electrical box assembly is provided. The electrical box assembly includes an electrical box. The electrical box includes a wiring box. The electrical box also includes an ingress/egress port defined in the wiring box.

The electrical box assembly also includes a non-metallic conduit hub. The non-metallic conduit hub includes a flange configured for attachment to the electrical box. The non-metallic conduit hub also includes a receiving member extending from a first side of the flange and defining a bore sized for receiving a conduit. The non-metallic conduit hub also includes an indexing indicator extending radially outward from the receiving member for providing a tactile indication of an orientation of the conduit hub. The non-metallic conduit hub also includes an alignment member extending from a second side of the flange and having an outer diameter sized for insertion into the ingress/egress port of the electrical box, wherein the bore extends through the receiving member, the flange, and the alignment member to facilitate routing of wires from the conduit into the electrical box.

In some embodiments the electrical box assembly also includes a keying feature defined in the indexing indicator of the receiving member. In some embodiments the electrical box assembly also includes a keyed adapter received in the bore of the receiving member and having a key received in the keying feature of the non-metallic conduit hub. In some embodiments the keyed adapter also includes an adapted bore defined therein, the adapted bore having a smaller diameter than a diameter of the bore of the receiving member.

In a further aspect, a method is provided for installing a non-metallic conduit into a metallic electrical box. The method includes removing a knockout plate from the metallic electrical box to expose an ingress/egress port. The method also includes inserting an alignment member extending from a second side of a flange of a non-metallic hub into the ingress/egress port of the electrical box. The method also includes positioning an indexing indicator extending radially outward from a receiving member of the non-metallic conduit hub in a prescribed orientation to orient the non-metallic conduit hub relative to the electrical box. The method also includes attaching the flange of the non-metallic conduit hub to the electrical box such that a bore extending through the receiving member, the flange, and the alignment member extends into the electrical box via the ingress/egress port. The method also includes installing a non-metallic conduit in the receiving member of the non-metallic conduit hub.

In some embodiments, the step of attaching the flange further comprises bolting the flange to the electrical box via a plurality of flange bolt holes and a corresponding plurality of electrical box bolt holes. In some embodiments, the step of attaching the flange further comprises sliding the flange into a slot formed on the electrical box. In some embodiments, the step of attaching the flange further comprises adhering the flange to the electrical box using an adhesive. In some embodiments, the method also includes inserting a keyed adapter into the bore in the receiving member such that a key of the keyed adapter is received a keying feature defined in the indexing indicator of the receiving member. In some embodiments, the keyed adapter also includes an adapted bore defined therein, the adapted bore having a smaller diameter than a diameter of the bore of the receiving member, wherein the step of installing the non-metallic conduit in the receiving member of the non-metallic conduit hub further comprises installing the non-metallic conduit in the adapted bore of the keyed adapter.

BRIEF DESCRIPTION OF THE FIGURES

Embodiments of the present disclosure will now be described, by way of example only, with reference to the attached Figures, wherein.

DETAILED DESCRIPTION OF THE INVENTION

Figure 1A:
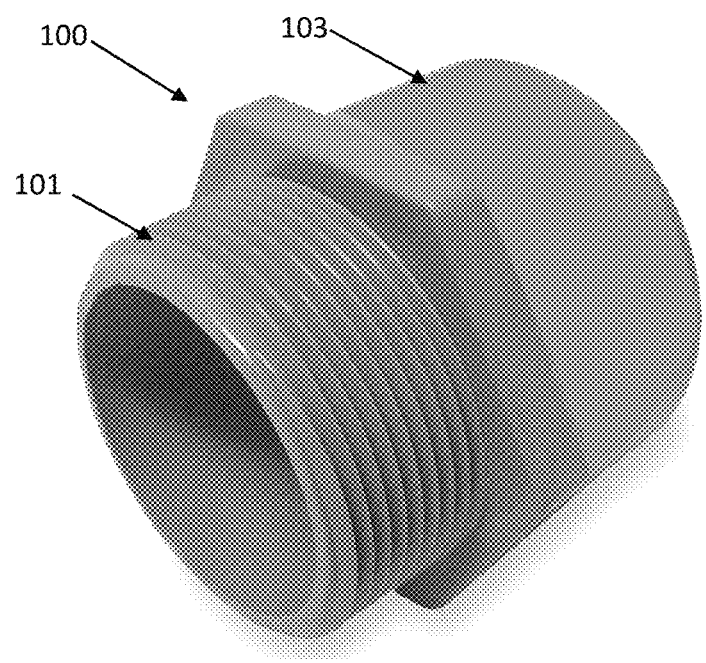
FIG. 1A is a perspective view of a non-metallic terminal adapter in accordance with the prior art.
Figure 1B:
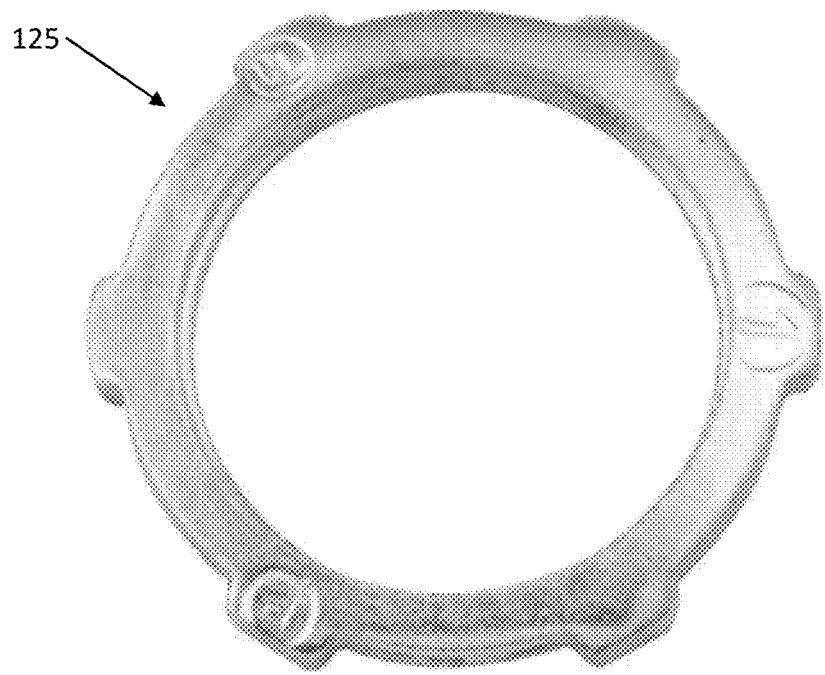
FIG. 1B is a perspective view of a lock nut for securing a non-metallic terminal adapter to a floor box in accordance with the prior art.
Figure 1C:
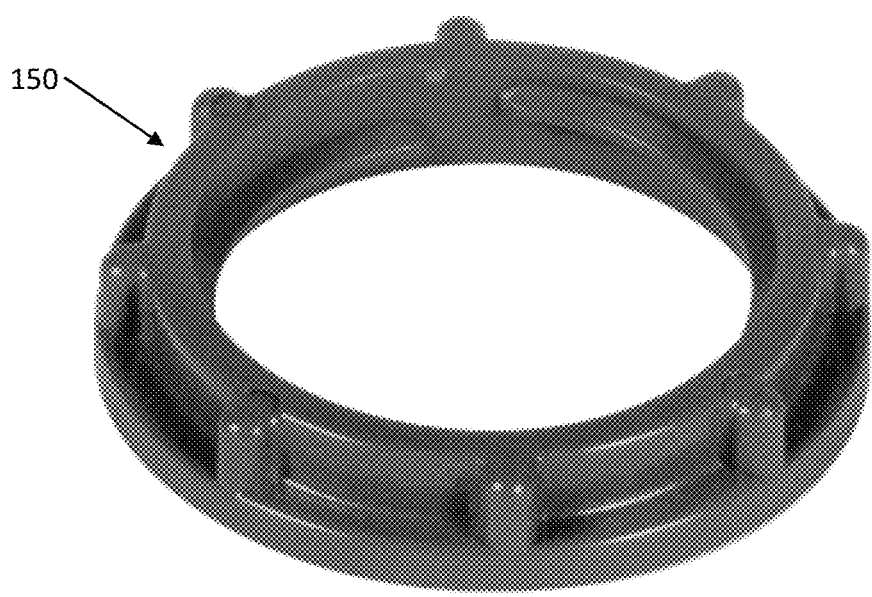
FIG. 1C is a perspective view of a non-metallic bushing for securing a non-metallic terminal adapter to a floor box in accordance with the prior art.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments, as the skilled artisan would recognize, even if not explicitly stated herein.

Descriptions of well-known components and processing techniques may be omitted to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Provided herein are non-metallic conduit hubs and corresponding electrical box assemblies for use in connection with installation of electrical wiring. Although shown and described herein as suitable for use with electrical floor boxes, it will be apparent in view of this disclosure that the non-metallic conduit hubs of the present invention can also be used in connection with any electrical box, including, for example, wall boxes and fire-rated poke-throughs (FRPTs).

Figure 3A:
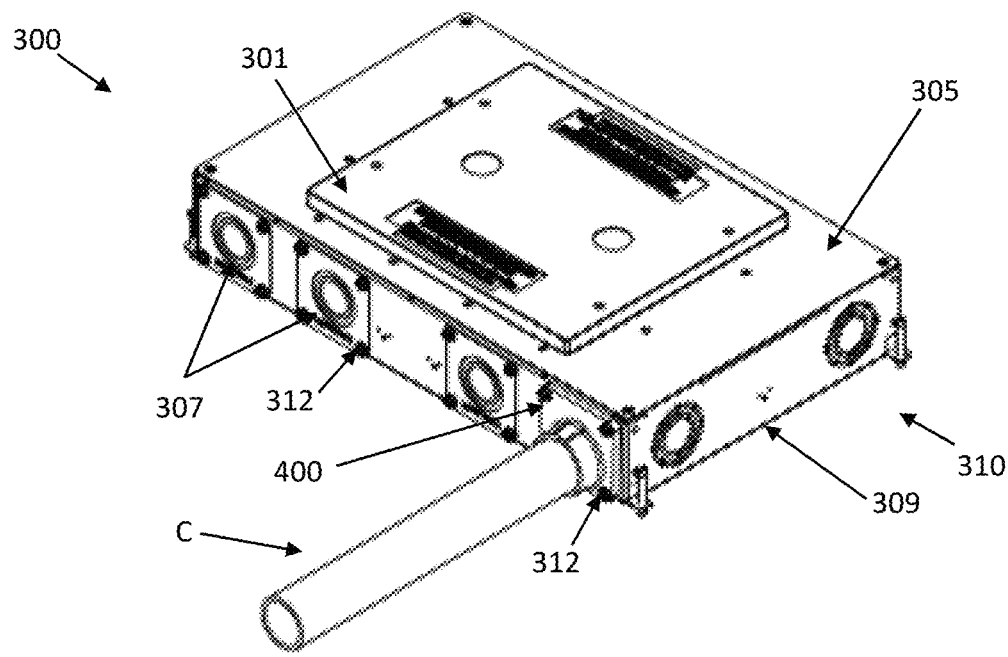
FIG. 3A is a perspective view of a floorbox assembly having a non-metallic conduit hub accepting a conduit in accordance with various embodiments.
Figure 3B:
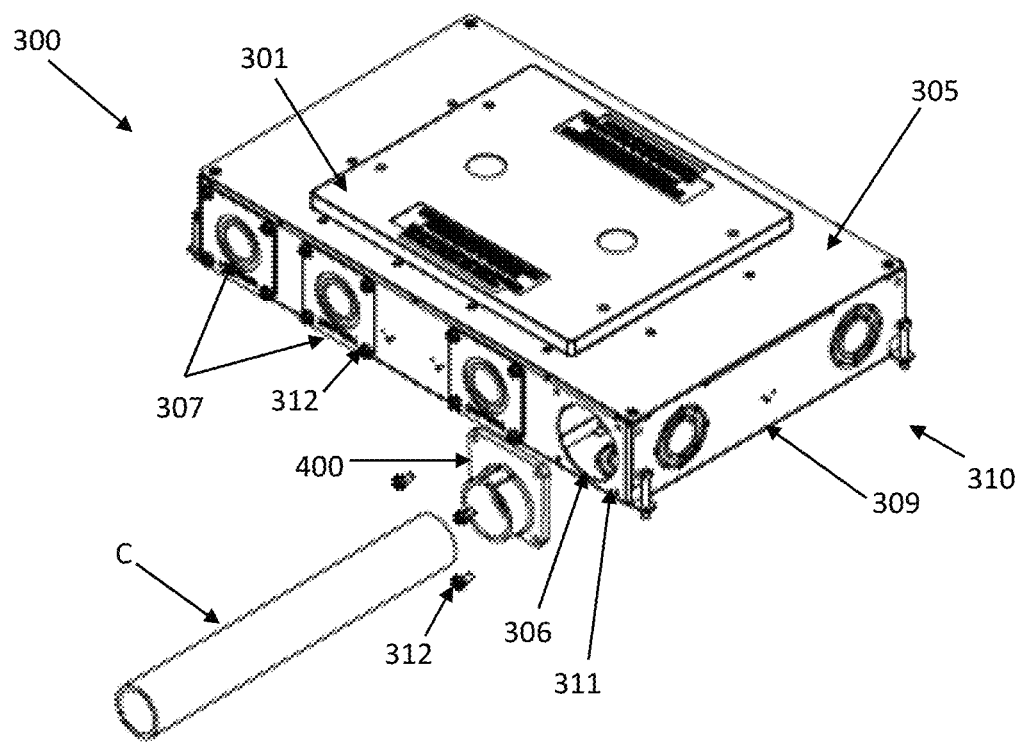
FIG. 3B is an exploded view of the floorbox assembly of FIG. 3A.

Referring now to FIGS. 3A and 3B, a floor box assembly 300 can generally include a floor box 310 and a non-metallic conduit hub 400 (the "hub") for receiving a non-metallic conduit C. The floor box 310 can include a concrete pour cap 301 to prevent ingress of concrete, a top mounting plate 305 connected to a wiring box 309, and one or more knockout plates 307 removably attached to and/or engaged with the wiring box 309. Any of the components (e.g., the concrete pour cap 301, the top mounting plate 305, the knockout plates 307, and the wiring box 309) of the floor box 310 can be constructed of any metal or non-metallic material including, for example, stamped steel, cast iron, cast aluminum, PVC, or any other suitable material and may, in accordance with various embodiments, be at least partially coated with a corrosion resistant material such as, for example, corrosion resistant paint.

Figure 2A:
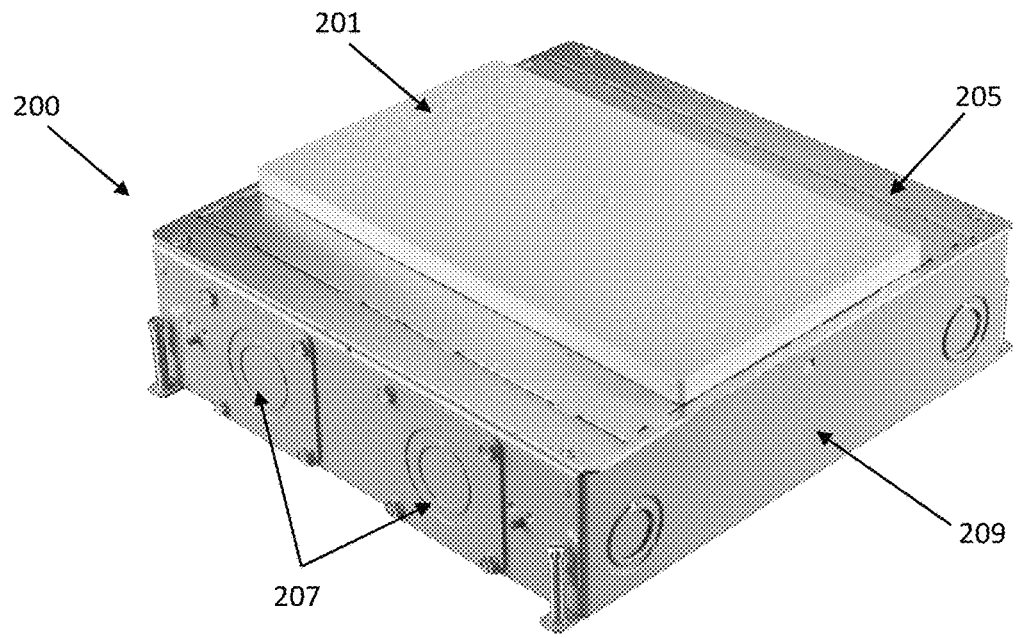
FIG. 2A is a perspective view of a fully assembled floorbox in accordance with the prior art.
Figure 2B:
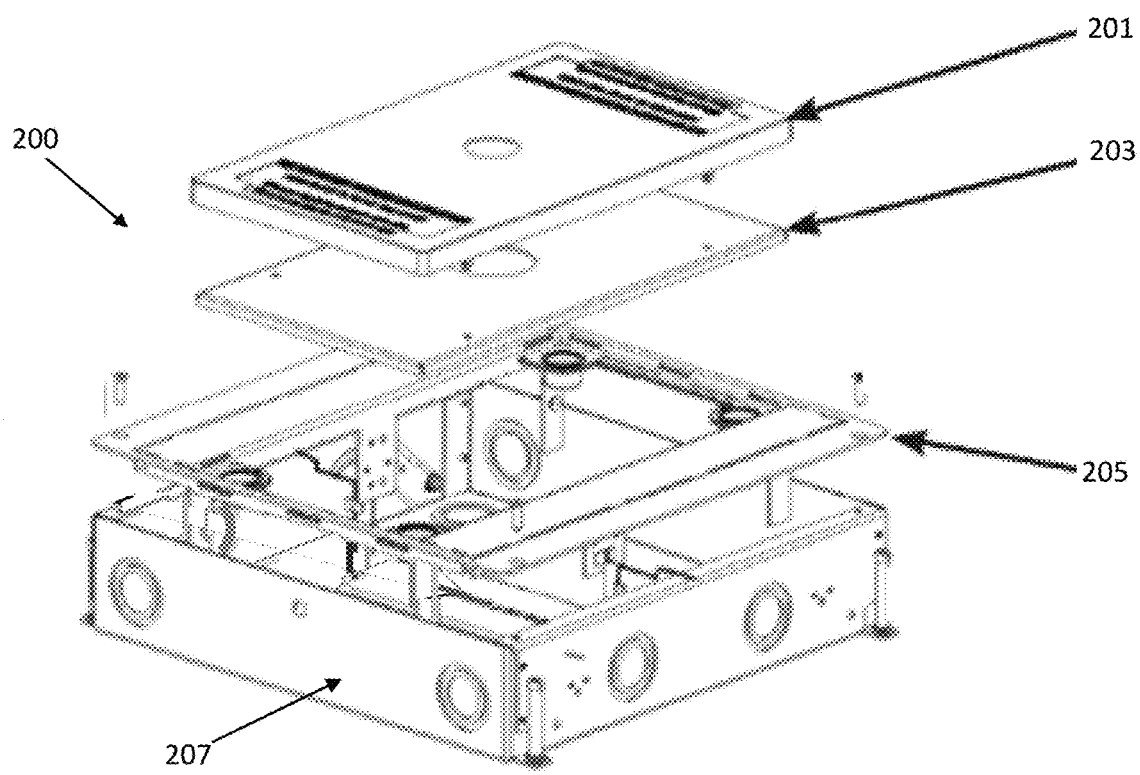
FIG. 2B is an exploded view of the prior art floorbox of FIG. 2A.
Figure 2C:
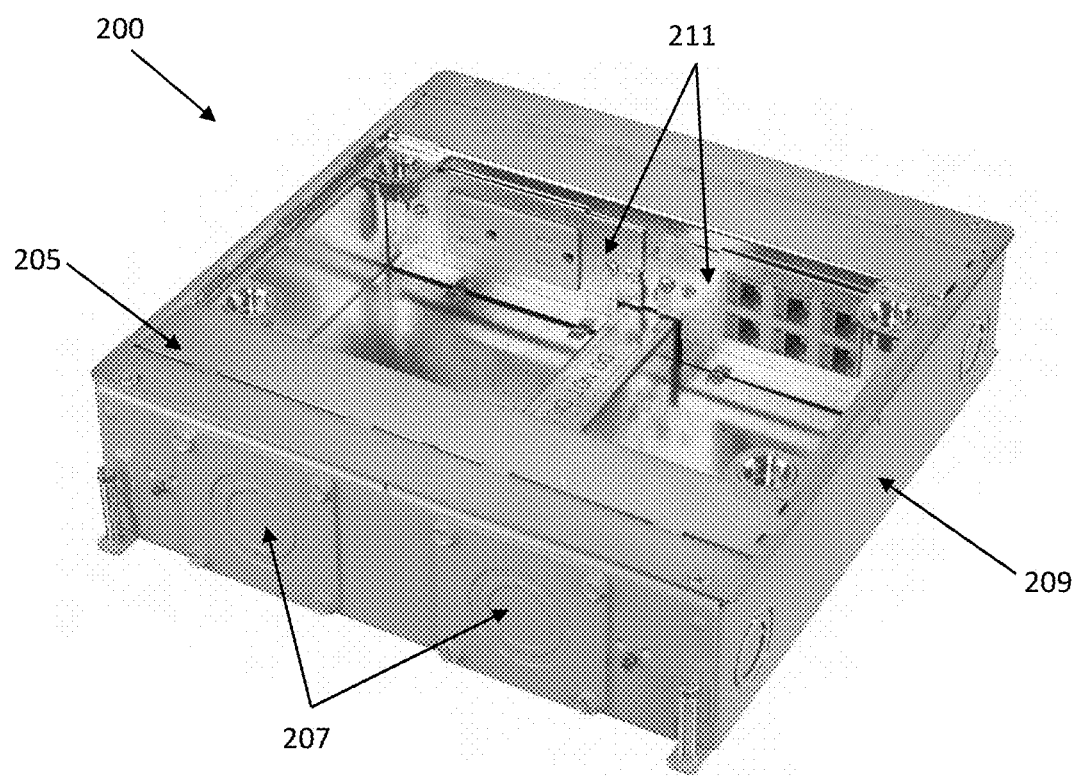
FIG. 2C is a perspective view of the floorbox of FIG. 2A having electrical outlet terminals installed therein.

The floor box 310 is configured to provide outlet terminals (not shown), e.g., outlet terminals 211 as shown in FIG. 2C, for power, data, and audio-visual (AV) connections, mounted within the wiring box 309, for various electronics and also to receive cables for connection to those terminals within the wiring box 309. For example, such outlet connections can include power outlets, USB outlets, HDMI outlets, ethernet outlets, coaxial cable outlets, or any other power, data, or AV outlet or connection, or combinations thereof. Although illustrated herein as an 6-gang floor box, it will be apparent in view of this disclosure that "floor box 310" can be interchangeable with any size and configuration of electrical box in accordance with various embodiments including, for example, single service boxes, multi-service boxes, round floor boxes, square or rectangular floor boxes, flush floor boxes, recessed floor boxes, 2-gang, 4-gang, 6-gang, 8-gang, or 10-gang floor boxes, fire-rated poke-throughs, or any other suitable electrical box having knockout plates removably attached thereto and/or engaged therewith.

The top mounting plate 305 is removably attachable to an open upper surface of the wiring box 309 and serves two primary functions. First, the top mounting plate 305 covers wiring or cabling retained in the wiring box 309 and connected to the outlet terminals. Second, in some embodiments, the top mounting plate 305 can include an aperture and/or mounting structures to facilitate mounting of and access to outlet terminals within the floor box 310 (e.g., outlet terminals 211 as shown in FIG. 2C) and/or to facilitate mounting a faceplate to the floor box 310 (typically installed after the floor is completed).

In some embodiments, one or more concrete pour caps 301 can be provided to cover the aperture of the top mounting plate 305 to prevent ingress of concrete and other foreign material into the wiring box 309 and/or the outlet terminals. The pour cap 301 can be non-metallic or metallic. In some embodiments, the pour cap 301 can include multiple pieces (e.g., non-metallic concrete pour cap 201 and a metallic pour cap 203 as shown in FIG. 2B).

The wiring box 309 can also include a plurality of ingress and/or egress ports 306 defined therein, each covered by a knockout plate 307. Knockout plates 307 can be removably attached to the wiring box 309 in a variety of ways. In some embodiments, knockout plates 307 are mounted external to the wiring box 309 via bolt-on attachment. For example, as shown in FIGS. 3A and 3B, a plurality of bolts 312 can be used in conjunction with a corresponding pattern of bolt holes 311 formed in the wiring box 309. Some knockout plates 307 are simply formed by stamping concentric rings into the wiring box 309 so as to weaken the wiring box 309 at the knockout plate 307 to permit subsequent literal "knocking out" of the material inside the stamped ring to create a hole (e.g., ingress/egress ports 306) sized for accommodating a conduit and for passing wire pulled through the conduit C and/or the floor box 310. Other knockout plates 307 may engage with slots or rails and slide vertically to removably cover a corresponding hole in the wiring box 309. More generally, it will be apparent in view of this disclosure that any suitable type and size of knockout plate 307 can be used in accordance with various embodiments.

The hub 400 can be assembled to the floor box 310 by first removing or "knocking out" one of the knockout plates 307 and replacing it by operatively engaging the hub 400 with the ingress/egress port 306 of the floor box 310. The hub 400 can preferably be constructed of a material compatible with non-metallic conduit C, typically non-metallic materials including, for example, PVC, fiberglass reinforced epoxy, reinforced thermosetting resin, combinations thereof, or any other suitable material.

As best shown in FIG. 3B, in some embodiments, the replaced knockout plates 307 are unbolted from the wiring box 309 and the hub 400 can then be bolted on via bolts (e.g., bolts 312) threaded into the corresponding bolt holes 311 formed in the wiring box 309. However, it will be apparent in view of this disclosure that any suitable means for fastening the non-metallic conduit hub ("hub") 400 to the floor box 310 can be used in accordance with various embodiments. For example, in some embodiments, slots or railings may be formed on the wiring box 309 and configured to slidably receive the hub 400 to retain it in place. In some embodiments, the hub 400 may be configured to be attached to the wiring box 309 via a glue, solvent adhesive, or other adhesive. In some embodiments, any combination of bolts, slots, glues, and/or adhesives can be used to engage and fasten the hub 400 to the floor box 310.

Figure 4A:
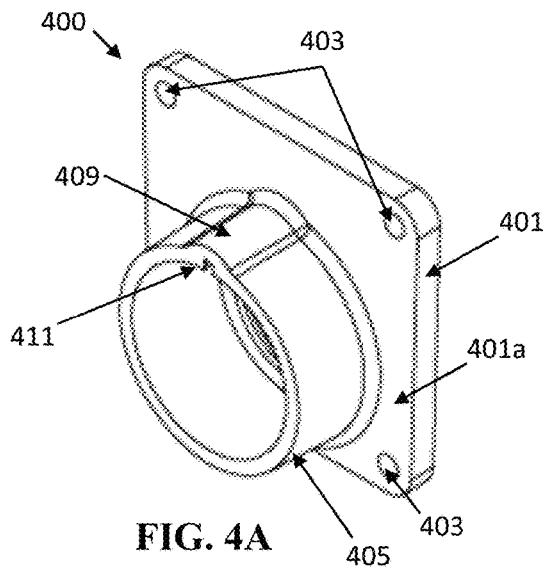
FIG. 4A is a perspective view of a non-metallic conduit hub in accordance with various embodiments.
Figure 4B:
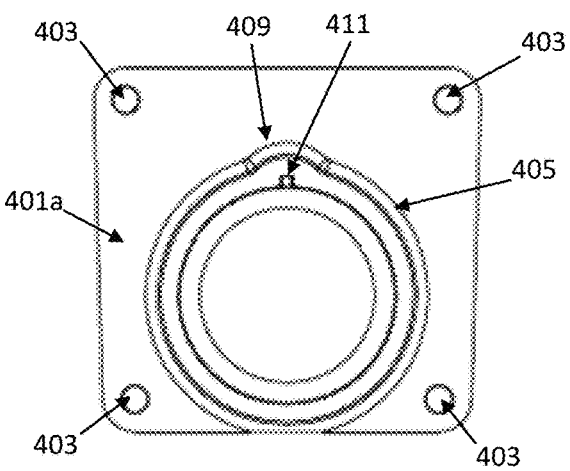
FIG. 4B is a front view of the non-metallic conduit hub of FIG. 4A in accordance with various embodiments.
Figure 4C:
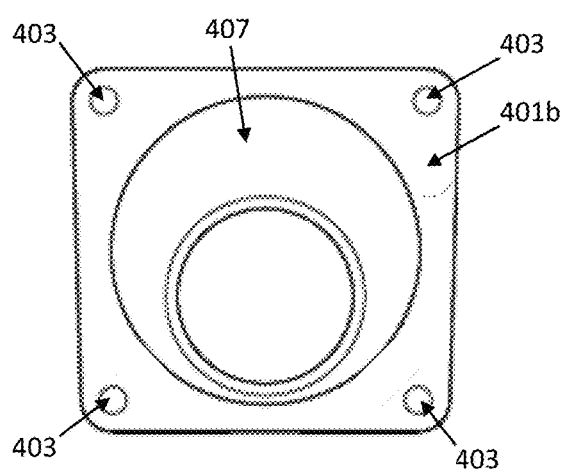
FIG. 4C is a rear view of the non-metallic conduit hub of FIG. 4A in accordance with various embodiments.

For example, as shown in FIGS. 4A-4E, the hub 400 can include a flange 401 for mounting the hub 400 to the floor box 310 at the ingress/egress port 306. As best shown in FIGS. 4B and 4C, in some embodiments the flange 401 can include a plurality of bolt holes 403. In general, the bolt holes 403 can be patterned to match a corresponding bolt hole pattern (e.g., bolt holes 311 as shown in FIG. 3B) of the wiring box 309. In some embodiments, to provide for quicker, more reliable orientation and alignment during installation, the flange 401 and/or bolt hole 403 pattern can be asymmetrical to indicate a correct orientation. For example, as best shown in FIGS. 4B and 4C, the flange 401 can have a generally trapezoidal shape, rather than, for example, a square or rectangular shape, to indicate to aid an installer.

Referring now to FIGS. 4A, 4B, 4D, and 4E, in some embodiments, the hub 400 can include a conduit receiving member 405 extending outward from a first side 401a of the flange 401 away from the floor box 310 and defining a bore therethrough, which further extends through the flange 401 and into the floor box 310 via alignment member 407.

The bore, particularly within the conduit receiving member 405, can generally be sized to accept conduit C for attachment to the floor box 310. As shown in FIGS. 4A, 4B, 4D, and 4E, in some embodiments a bottom of the receiving member 405 can preferably be positioned at a bottom of the hub 400 flange 401 and by extension, when installed, near the bottom of the box 310 to provide easier pulling of wire through the conduit C between boxes 310. However, it will be apparent in view of this disclosure that the receiving member 405 of the hub 400 may be positioned at any location relative to the flange 401 in accordance with various embodiments. For example, the receiving member 405 can be located central, top, bottom, left, right, or combinations thereof relative to the flange 401.

In order to facilitate proper orientation of the hub 400 (and thereby the receiving member 405), the receiving member 405 can also include an indexing indicator 409 to provide a visual and tactile indication of an orientation of the hub 400 to facilitate installation of the hub 400 onto the box. In addition, the indexing indicator 409 can provide a region of thicker sidewall material surrounding the bore in order to accommodate a keying feature 411 defined therein.

Referring to FIGS. 4A, 4B, 5A, and 5B, in some embodiments, the receiving member 405 can be configured to receive a keyed adapter 500 into the bore and a key 501 of the keyed adapter 500 into the keying feature 411. Generally, the keyed adapter 500 can define an adapted bore configured to reduce a diameter of conduit C to be received in the hub 400. As with the hub 400, the adapted bore of the keyed adapter 500 can preferably be positioned at a bottom of the hub 400 flange 401 and by extension, at the bottom of the bore within the receiving member 405. Thus, when installed, the adapted bore of the keyed adapter 500 can be positioned near the bottom of the box 310 to provide easier pulling of wire through the conduit C between boxes 310. However, as with the bore of the receiving member 405, it will be apparent in view of this disclosure that the adapted bore of the keyed adapter 500 may be positioned at any location relative to the flange 401 and/or the receiving member 405 in accordance with various embodiments. For example, the keyed adapter 500 can be located central, top, bottom, left, right, or combinations thereof relative to the flange 401 and/or the receiving member 405. In some embodiments a key 501 of the keyed adapter 500 can be received by the keying feature 411 in order to properly align the keyed adapter 500 with the hub 400.

Figure 4D:
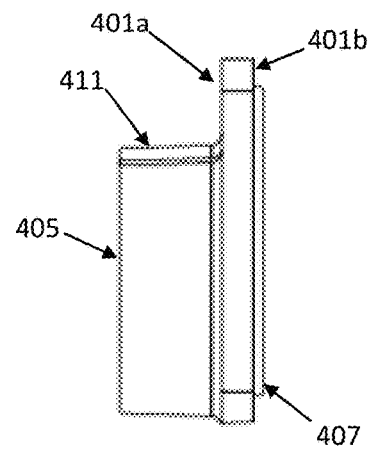
FIG. 4D is a side view of the non-metallic conduit hub of FIG. 4A in accordance with various embodiments.
Figure 4E:
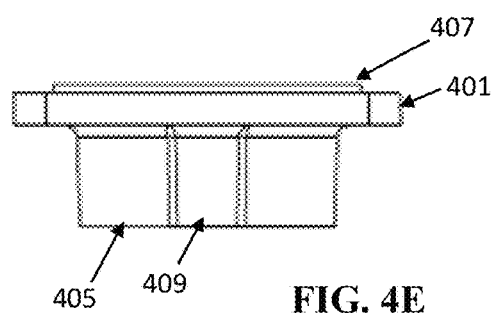
FIG. 4E is a top view of the non-metallic conduit hub of FIG. 4A in accordance with various embodiments.

Referring now to FIGS. 4C, 4D, and 4E, in some embodiments the hub 400 can include an alignment member 407 extending from a second side 401b of the flange 401. The alignment member 407 can generally be configured to be inserted into the ingress/egress port 306 of the floor box 310 thereby ensuring alignment between the bore of the hub 400 with the ingress/egress port 306 of the floor box 310. The alignment member 407 can also define a portion of the bore of the hub 400 to permit ingress/egress of wiring from the conduit C into the floor box 310. In addition to the alignment functionality, the alignment member 407, by extending into the ingress/egress port 306, can prevent any sharp or obstructive edges of the hub 400 or ingress/egress port 306 from being exposed at the interface between the hub 400 and the floor box 310 (e.g., by variation in the tolerance stack associated with the size and/or position of the hub 400, bore, receiving member 405, ingress/egress port 306, and bolt holes 311, 403, etc. By preventing the exposure of such sharp edges, the floor box assembly 300 can consequently avoid inadvertent damage such as cutting, scraping, or abrasion to the wires entering or exiting the floor box 310 from or to conduit C via ingress/egress port 306.

It will be understood in view of this disclosure that the hub 400 and its constituent elements, as well as any keyed adapters 500, can be sized both in the absolute and relative to one another according to various factors including, for example, the size of the conduit C to be received by the receiving member 405, the size of the ingress/egress port 306 into which the alignment member 407 is to be inserted, the height dimension of the floor box 310 to which the flange 401 is to be attached, the spacing and pattern of the bolt holes 311 with which the bolt holes 403 of the flange 401 are to be aligned, or combinations thereof. For example, in the embodiment illustrated by FIGS. 3A-3B and 4A-4E, the hub 400 includes a 1.25" diameter bore for receiving a 1.25" conduit C into the receiving member 405, which is biased to the bottom of the flange 401 and the bottom of the ingress/egress port. In that regard, the alignment member 407 includes an outer diameter of about 2" for insertion into the 2" diameter ingress/egress port 306 of the floor box 310 wherein the 1.25" bore is also biased to the bottom of the alignment member 407. However, it will be apparent in view of the disclosure that, as illustrated below with reference to FIGS. 6A-6B and 7A-7E, the hub can be designed with a bore of any desired size and resulting relative position of the bore to the flange and the floor box.

Figure 5A:
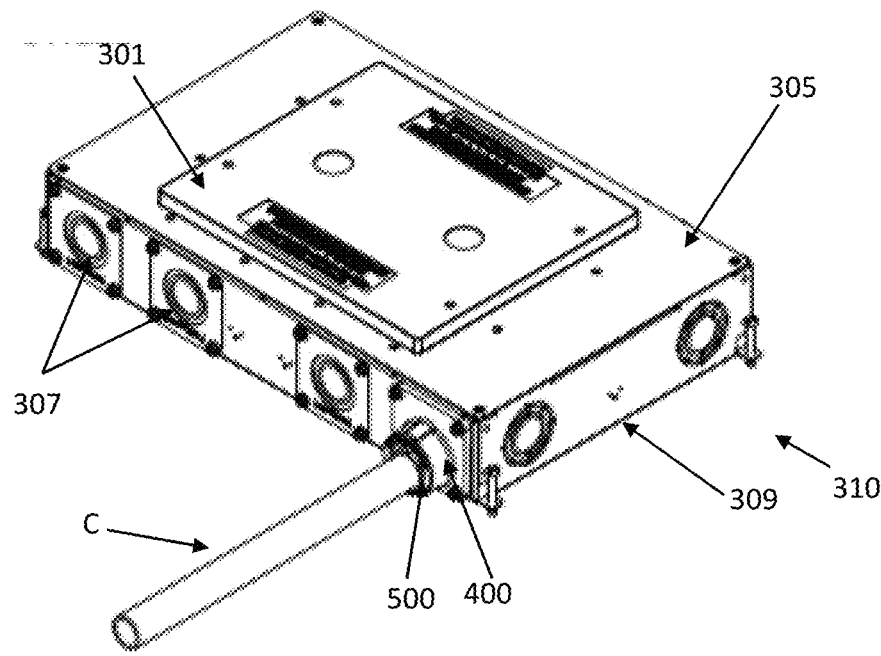
FIG. 5A is a perspective view of the floorbox assembly of FIG. 4A having a grommet inserted within the non-metallic conduit hub for accepting a differently sized conduit in accordance with various embodiments.
Figure 5B:
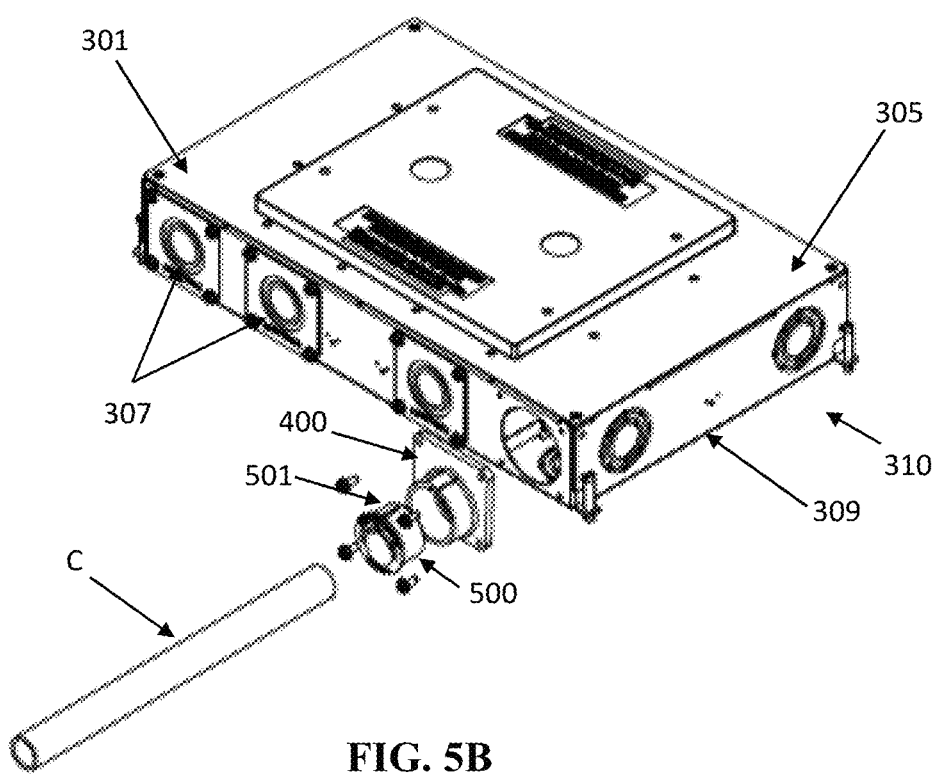
FIG. 5B is an exploded view of the floorbox assembly of FIG. 5A.

Additionally, in some embodiments, receiving of a smaller conduit may be required, sometimes in a same floor box 310 or a same group of floor boxes 310 being simultaneously installed for a single job. In such embodiments it may be cumbersome, expensive, and slow for an installer to keep hubs of various different sizes on hand and need to individually sort through each one to find the correct size. Accordingly, as shown in FIGS. 5A-5B, keyed adapters 500 of one or more sizes can be provided such that the installer can readily adapt the hub to a desired size. For example, the keyed adapters 500 shown in FIGS. 5A-5B include an outer diameter of 1.25" for insertion into the 1.25" diameter bore of the hub 400 and an interior adapted bore having a 0.75" diameter to accommodate 0.75" conduit C. However, it will be apparent in view of this disclosure that, as illustrated below with reference to FIGS. 8A-8B, keyed adapters can be provided having any suitable outer diameter for insertion into a corresponding hub and can further be provided with an interior adapted bore having any diameter smaller than the diameter of the bore of the hub as needed for receiving a conduit of corresponding size.

In some embodiments, the keyed adapters can be provided in an assembly of keyed adapters having a plurality of keyed adapters, each with a different adapted diameter, to ensure the installer has ready access to whichever size is needed. Such assemblies (not shown) can, for example be provided in the form of a tree having each of the keyed adapters attached together as a unit by a corresponding frangible connection to the tree.

Figure 6A:
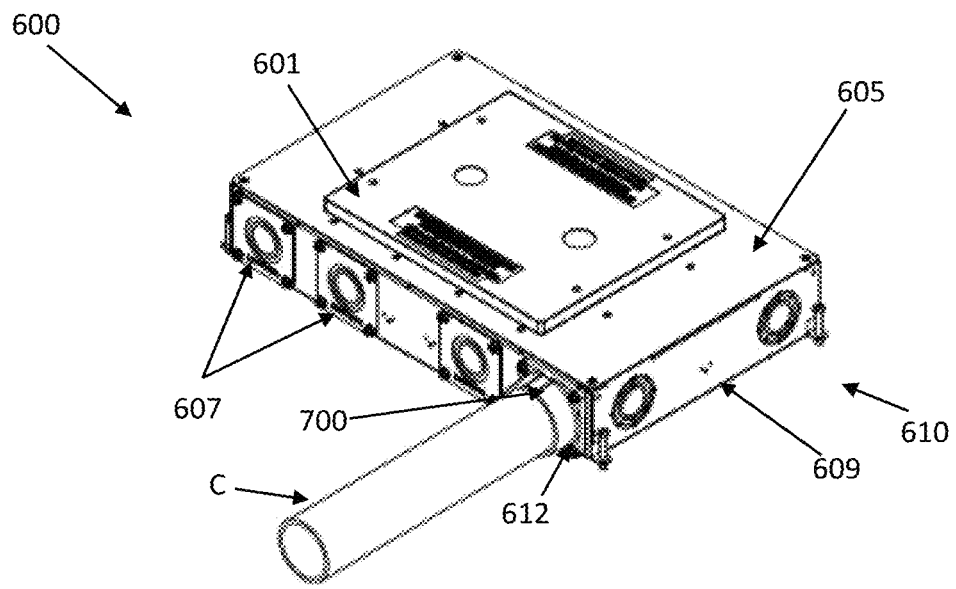
FIG. 6A is a perspective view of a floorbox assembly having an alternative non-metallic conduit hub accepting a conduit in accordance with various embodiments.
Figure 6B:
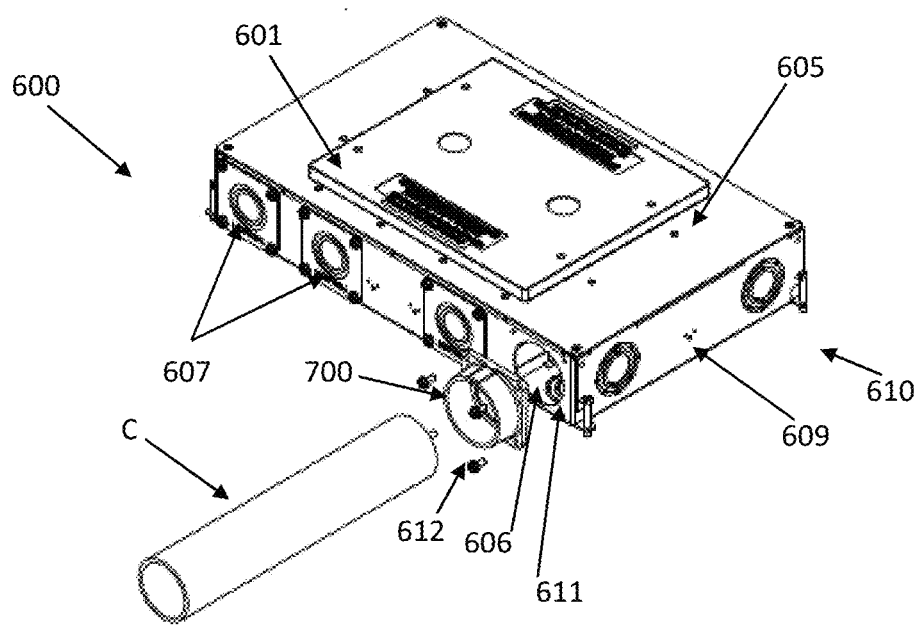
FIG. 6B is an exploded view of the floorbox assembly of FIG. 5A.

Referring now to FIGS. 6A and 6B, a floor box assembly 600 can generally include a floor box 610 and a non-metallic conduit hub 700 (the "hub") for receiving a non-metallic conduit C. The floor box 610 can include a concrete pour cap 601 to prevent ingress of concrete, a top mounting plate 605 connected to a wiring box 609, and one or more knockout plates 607 removably attached to and/or engaged with the wiring box 609. Any of the non-hub components (e.g., the concrete pour cap 601, the top mounting plate 605, the knockout plates 607, and the wiring box 609 of the floor box 610) can be, for example, substantially similar to the corresponding components (e.g., the concrete pour cap 301, the top mounting plate 305, the knockout plates 307, and the wiring box 309 of the floor box 310) described above with reference to FIGS. 3A-3B.

The wiring box 609 can also include a plurality of ingress and/or egress ports 606 defined therein, each covered by a knockout plate 607. Knockout plates 607 can be removably attached to the wiring box 609 in a variety of ways. In some embodiments, knockout plates 607 are mounted external to the wiring box 609 via bolt-on attachment. For example, as shown in FIGS. 6A and 6B, a plurality of bolts 612 can be used in conjunction with a corresponding pattern of bolt holes 611 formed in the wiring box 609. Some knockout plates 607 are simply formed by stamping concentric rings into the wiring box 609 so as to weaken the wiring box 609 at the knockout plate 607 to permit subsequent literal "knocking out" of the material inside the stamped ring to create a hole (e.g., ingress/egress ports 606) sized for accommodating a conduit and for passing wire pulled through the conduit C and/or the floor box 610. Other knockout plates 607 may engage with slots or rails and slide vertically to removably cover a corresponding hole in the wiring box 609. More generally, it will be apparent in view of this disclosure that any suitable type and size of knockout plate 607 can be used in accordance with various embodiments.

The hub 700 can be assembled to the floor box 610 by first removing or "knocking out" one of the knockout plates 607 and replacing it by operatively engaging the hub 700 with the ingress/egress port 606 of the floor box 610. The hub 700 can preferably be constructed of a material compatible with non-metallic conduit C, typically non-metallic materials including, for example, PVC, fiberglass reinforced epoxy, reinforced thermosetting resin, combinations thereof, or any other suitable material.

Figure 7A:
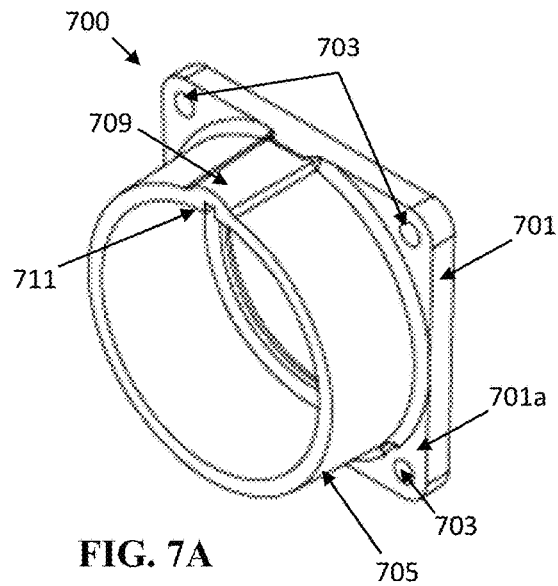
FIG. 7A is a perspective view of an alternative non-metallic conduit hub in accordance with various embodiments.
Figure 7B:
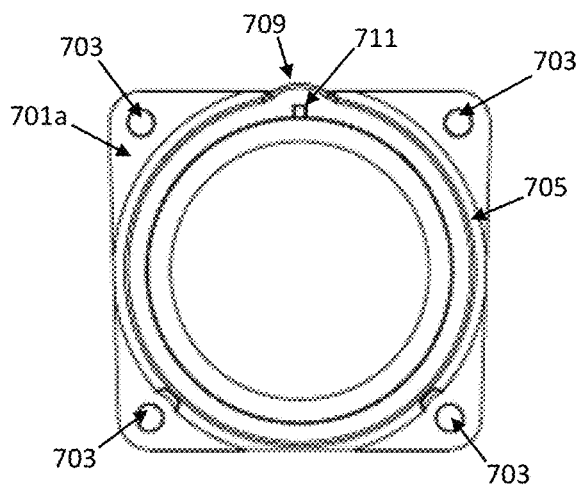
FIG. 7B is a front view of the alternative non-metallic conduit hub of FIG. 6A in accordance with various embodiments.
Figure 7C:
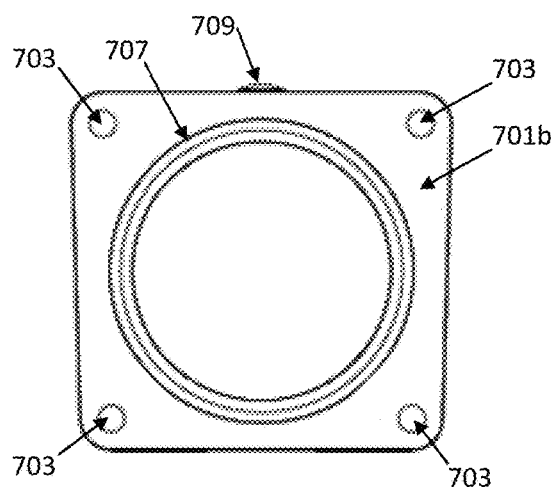
FIG. 7C is a rear view of the alternative non-metallic conduit hub of FIG. 6A in accordance with various embodiments.

As best shown in FIG. 6B, in some embodiments, the replaced knockout plates 607 are unbolted from the wiring box 609 and the hub 700 can then be bolted on via bolts (e.g., bolts 612) threaded into the corresponding bolt holes 611 formed in the wiring box 609. However, it will be apparent in view of this disclosure that any suitable means for engaging the non-metallic conduit hub ("hub") 700 with the floor box 610 can be used in accordance with various embodiments. For example, in some embodiments, slots or railings may be formed on the wiring box 609 and configured to slidably receive the hub 700 to retain it in place. In some embodiments, the hub 700 may be configured to be attached to the wiring box 609 via a glue or other adhesive. As shown in FIGS. 7A-7E, the hub 400 can include a flange 701 for mounting the hub 700 to the floor box 610 at the ingress/egress port 606. As best shown in FIGS. 7B and 7C, in some embodiments the flange 701 can include a plurality of bolt holes 703. In general, the bolt holes 703 can be patterned to match a corresponding bolt hole pattern (e.g., bolt holes 611 as shown in FIG. 6B) of the wiring box 609. In some embodiments, to provide for quicker, more reliable orientation and alignment during installation, the flange 701 and/or bolt hole 703 pattern can be asymmetrical to indicate a correct orientation. For example, as best shown in FIGS. 7B and 7C, the flange 701 can have a generally trapezoidal shape, rather than, for example, a square or rectangular shape, to indicate to aid an installer.

Referring now to FIGS. 7A, 7B, 7D, and 7E, in some embodiments, the hub 700 can include a conduit receiving member 705 extending outward from a first side 701a of the flange 701 away from the floor box 610 and defining a bore therethrough, which further extends through the flange 701 and into the floor box 610 via alignment member 707.

Similar to the hub of FIGS. 4A-4E, the bore, particularly within the conduit receiving member 705, can generally be sized to accept conduit C for attachment to the floor box 610. As shown in FIGS. 7A, 7B, 7D, and 7E, in some embodiments a bottom of the receiving member 705 can preferably be positioned at a bottom of the hub 700 flange 701 and by extension, when installed, near the bottom of the box 610 to provide easier pulling of wire through the conduit C between boxes 610. However, in the embodiment depicted in FIGS. 7A, 7B, 7D, and 7E the receiving member 705 of the hub 700 is sufficiently large that an outer diameter of the receiving member is coextensive with the width and height of the flange 701, leaving little or no room for relative positioning of the bore. As noted above, it will be apparent in view of this disclosure that the size of the bore, receiving member 705, and flange 701 can be sized to fit particular floor boxes 610 and bolt hole patterns 611. In the particular embodiment of FIGS. 6A-6B and 7A-7E, the bore is 2" in diameter to accommodate 2" conduit, thereby accommodating larger and/or more numerous wires and cables as required.

In order to facilitate proper orientation of the hub 700 (and thereby the receiving member 705), the receiving member 705 can also include an indexing indicator 709 to provide a visual and tactile indication of an orientation of the hub 700 to facilitate installation of the hub 700 onto the box. In addition, the indexing indicator 709 can provide a region of thicker sidewall material surrounding the bore in order to accommodate a keying feature 711 defined therein. Notably, as shown in FIGS. 7A-7E, because of the increased diameter of the receiving member 705 relative to the flange 701, in some embodiments the indexing indicator 709 can extend radially beyond the height or width of the flange 701 at least along a portion of the indexing indicator 709.

Referring to FIGS. 4A, 4B, 5A, and 5B, in some embodiments, the receiving member 705 can be configured to receive a keyed adapter 800 into the bore. Generally, the keyed adapter can define an adapted bore configured to reduce a diameter of conduit C to be received in the hub 800. As with the hub 700, the adapted bore of the keyed adapter 800 can preferably be positioned at a bottom of the hub 700 flange 701 and by extension, at the bottom of the bore within the receiving member 705. Thus, when installed, the adapted bore of the keyed adapter 800 can be positioned near the bottom of the box 610 to provide easier pulling of wire through the conduit C between boxes 610. However, as with the bore of the receiving member 705, it will be apparent in view of this disclosure that the adapted bore of the keyed adapter 800 may be positioned at any location relative to the flange 701 and/or the receiving member 705 in accordance with various embodiments. For example, the keyed adapter 700 can be located central, top, bottom, left, right, or combinations thereof relative to the flange 701 and/or the receiving member 705. In some embodiments a key 801 of the keyed adapter 800 can be received by the keying feature 711 in order to properly align the keyed adapter 800 with the hub 700.

Figure 8A:
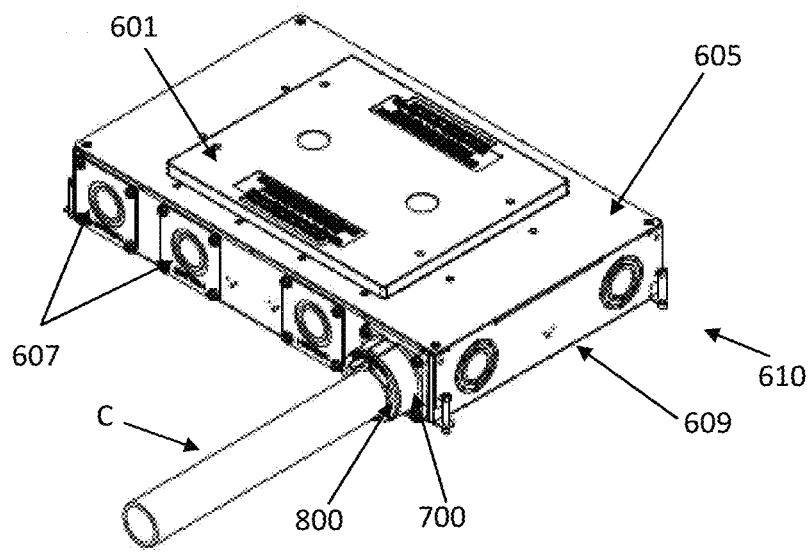
FIG. 8A is a perspective view of the floorbox assembly of FIG. 5A having a grommet inserted within the non-metallic conduit hub for accepting a differently sized conduit in accordance with various embodiments.
Figure 8B:
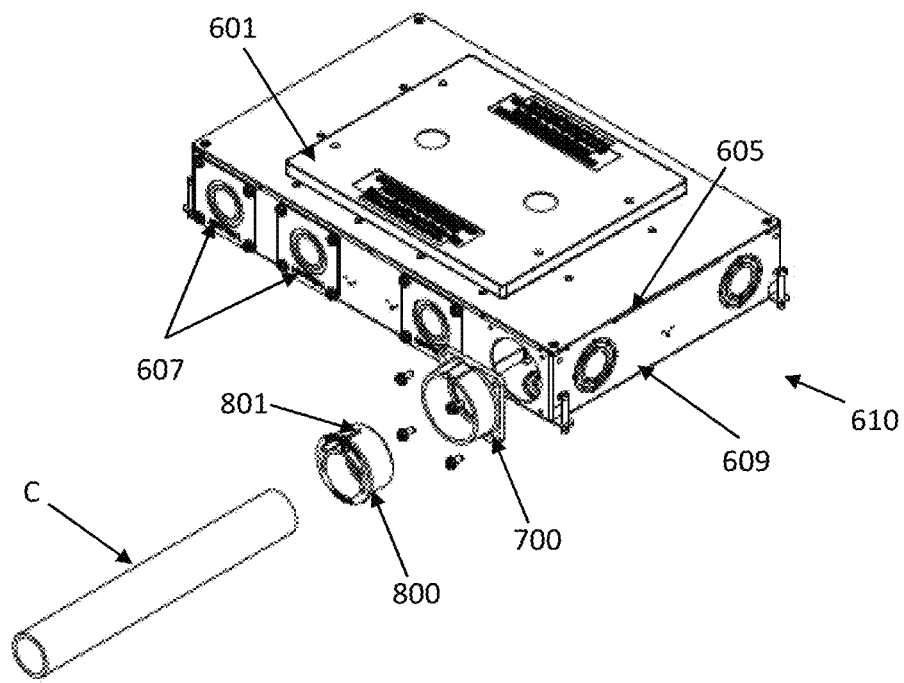
FIG. 8B is an exploded view of the floorbox assembly of FIG. 7A.

In the particular embodiment illustrated in FIGS. 8A-8B, the adapted bore of the keyed adapter 800 is 1.25". However, it will be apparent in view of this disclosure that keyed adapters can be provided having any suitable outer diameter for insertion into a corresponding hub and can further be provided with an interior adapted bore having any diameter smaller than the diameter of the bore of the hub as needed for receiving a conduit of corresponding size. Additionally, as noted above, in some embodiments, the keyed adapters can be provided in an assembly of keyed adapters having a plurality of keyed adapters, each with a different adapted diameter, to ensure the installer has ready access to whichever size is needed. Such assemblies (not shown) can, for example be provided in the form of a tree having each of the keyed adapters attached together as a unit by a corresponding frangible connection to the tree. In some embodiments, the adapted bores of the keyed adapters in the keyed adapter assembly may be a plurality of common conduit sizes less than the size of the bore of the hub such as, for example, 0.5", 0.75", 1", 1.25", and 1.5".

Figure 7D:
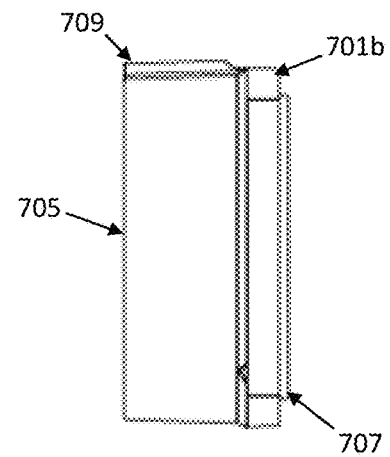
FIG. 7D is a side view of the alternative non-metallic conduit hub of FIG. 6A in accordance with various embodiments.
Figure 7E:
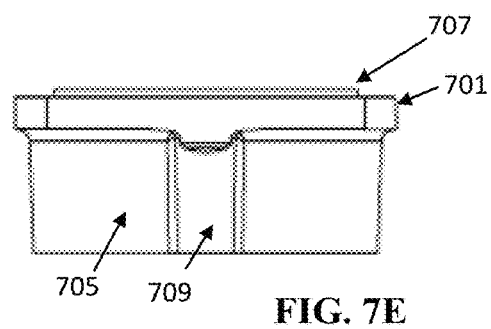
FIG. 7E is a top view of the alternative non-metallic conduit hub of FIG. 6A in accordance with various embodiments.

Referring now to FIGS. 7C, 7D, and 7E, in some embodiments the hub 700 can include an alignment member 707 extending from a second side 701b of the flange 701. The alignment member 707 can generally be configured to be inserted into the ingress/egress port 606 of the floor box 610 thereby ensuring alignment between the bore of the hub 700 with the ingress/egress port 606 of the floor box 610. The alignment member 707 can also define a portion of the bore of the hub 700 to permit ingress/egress of wiring from the conduit C into the floor box 610. In addition to the alignment functionality, the alignment member 707, by extending into the ingress/egress port 606, can prevent any sharp or obstructive edges of the hub 700 or ingress/egress port 606 from being exposed at the interface between the hub 700 and the floor box 610 (e.g., by variation in the tolerance stack associated with the size and/or position of the hub 700, bore, receiving member 705, ingress/egress port 606, and bolt holes 611, 703, etc. By preventing the exposure of such sharp edges, the floor box assembly 600 can consequently avoid inadvertent damage such as cutting, scraping, or abrasion to the wires entering or exiting the floor box 610 from or to conduit C via ingress/egress port 606.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above described embodiments and examples.

Having described the invention, and a preferred embodiment thereof, what is claimed as new and secured by letters patent is:

What is claimed is:

1. A non-metallic conduit hub comprising:
   a flange having opposing first and second sides and configured for attachment to an electrical box such that, when the flange is attached to the electrical box, the second side of the flange faces the electrical box;
   a receiving member connected at a first end to the first side of the flange and extending outward from the first side of the flange away from the electrical box such that, when the flange is attached to the electrical box, the receiving member is positioned entirely exterior to the electrical box, the receiving member defining a bore sized for receiving a conduit, a bottom of the receiving member aligned with a lower edge of the flange;
   an indexing indicator extending radially outward from the receiving member for providing a tactile indication of an orientation of the conduit hub; and
   an alignment member extending outward from the second side of the flange, away from the first side of the flange and the receiving member, the alignment member having an outer diameter sized for insertion into an ingress/egress port of the electrical box,
   wherein the bore extends through the receiving member, the flange, and the alignment member to facilitate routing of wires from the conduit into the electrical box,
   wherein the flange is attachable to the electrical box only in an upright orientation of the non-metallic conduit hub wherein the lower edge of the flange is aligned with a bottom of the electrical box.

2. The non-metallic conduit hub of claim 1, wherein the flange further comprises a plurality of flange bolt holes patterned for alignment with a corresponding plurality of electrical box bolt holes of the electrical box for bolting of the non-metallic conduit hub to the electrical box.

3. The non-metallic conduit hub of claim 1, wherein the flange is sized to slide into tracks of a slot formed on the electrical box.

4. The non-metallic conduit hub of claim 1, further comprising an adhesive for adhering the flange to the electrical box.

5. The non-metallic conduit hub of claim 1, further comprising a keying feature defined in the indexing indicator of the receiving member for receiving a key of a keyed adapter.

6. The non-metallic conduit hub of claim 5, wherein the keyed adapter further comprises an adapted bore defined therein, the adapted bore having a smaller diameter than a diameter of the bore of the receiving member.

7. The non-metallic conduit hub of claim 5, wherein the keying feature is a slot.

8. The non-metallic conduit hub of claim 1, wherein the non-metallic conduit hub is constructed of at least one of PVC, fiberglass reinforced epoxy, reinforced thermosetting resin, or combinations thereof.

9. The non-metallic conduit hub of claim 1, wherein the electrical box is constructed of at least one of metal or metal having a corrosion resistant coating.

10. The non-metallic conduit hub of claim 1, wherein the electrical box is a non-metallic electrical box, the non-metallic electrical box being constructed of at least one of PVC, fiberglass reinforced epoxy, reinforced thermosetting resin, or combinations thereof.

11. An electrical box assembly comprising:
   an electrical box including:
      a wiring box, and
      an ingress/egress port defined in the wiring box; and
   a non-metallic conduit hub including:
      a flange having opposing first and second sides and configured for attachment to an electrical box such that, when the flange is attached to the electrical box, the second side of the flange faces the electrical box, a receiving member connected at a first end to the first side of the flange and extending outward from the first side of the flange away from the electrical box such that, when the flange is attached to the electrical box, the receiving member is positioned entirely exterior to the electrical box, the receiving member defining a bore sized for receiving a conduit, a bottom of the receiving member aligned with a lower edge of the flange, an indexing indicator extending radially outward from the receiving member for providing a tactile indication of an orientation of the conduit hub, and an alignment member extending outward from the second side of the flange, away from the first side of the flange and the receiving member, the alignment member having an outer diameter sized for insertion into the ingress/egress port of the electrical box, wherein the bore extends through the receiving member, the flange, and the alignment member to facilitate routing of wires from the conduit into the electrical box, and wherein the flange is attachable to the electrical box only in an upright orientation of the non-metallic conduit hub wherein the lower edge of the flange is aligned with a bottom of the electrical box.

12. The assembly of claim 11, further comprising a keying feature defined in the indexing indicator of the receiving member.

13. The assembly of claim 12, further comprising a keyed adapter received in the bore of the receiving member and having a key received in the keying feature of the non-metallic conduit hub.

14. The assembly of claim 13, wherein the keyed adapter further comprises an adapted bore defined therein, the adapted bore having a smaller diameter than a diameter of the bore of the receiving member.

15. A method for installing a non-metallic conduit into a metallic electrical box comprising:

removing a knockout plate from the metallic electrical box to expose an ingress/egress port;

inserting an alignment member extending outward from a second side of a flange of a non-metallic conduit hub into the ingress/egress port of the electrical box such that the second side of the flange faces the electrical box, the non-metallic conduit hub further having a receiving member connected at a first end to an opposing first side of the flange and extending outward from the first side of the flange, away from the second side of the flange, the alignment member, and the electrical box such that, when the flange is attached to the electrical box, the receiving member is positioned entirely exterior to the electrical box, wherein a bottom of the receiving member is aligned with a lower edge of the flange;

positioning an indexing indicator extending radially outward from the receiving member of the non-metallic conduit hub in a prescribed orientation to orient the non-metallic conduit hub relative to the electrical box;

attaching the flange of the non-metallic conduit hub to the electrical box such that a bore sized for receiving a conduit extends through the receiving member, the flange, and the alignment member and into the electrical box via the ingress/egress port; and installing a non-metallic conduit in the receiving member of the non-metallic conduit hub, wherein the flange is attachable to the electrical box only in an upright orientation of the non-metallic conduit hub wherein the lower edge of the flange is aligned with a bottom of the electrical box.

16. The method of claim 15, wherein the step of attaching the flange further comprises bolting the flange to the electrical box via a plurality of flange bolt holes and a corresponding plurality of electrical box bolt holes.

17. The method of claim 15, wherein the step of attaching the flange further comprises sliding the flange into a slot formed on the electrical box.

18. The method of claim 15, wherein the step of attaching the flange further comprises adhering the flange to the electrical box using an adhesive.

19. The method of claim 15, further comprising inserting a keyed adapter into the bore in the receiving member such that a key of the keyed adapter is received a keying feature defined in the indexing indicator of the receiving member.

20. The method of claim 19, wherein the keyed adapter further comprises an adapted bore defined therein, the adapted bore having a smaller diameter than a diameter of the bore of the receiving member, wherein the step of installing the non-metallic conduit in the receiving member of the non-metallic conduit hub further comprises installing the non-metallic conduit in the adapted bore of the keyed adapter.

* * * * *